United States Patent [19]

Matsui et al.

[11] Patent Number: 4,838,287

[45] Date of Patent: Jun. 13, 1989

[54] METHOD AND DEVICE FOR ELECTROMAGNETIC REMOVAL OF SPATTER ON NOZZLE OF ARC WELDING TORCH

[75] Inventors: Hitoshi Matsui; Hiroshi Suzuki, both of Toyota, Japan

[73] Assignee: Toyota Jidosha Kabushiki Kaisha, Aichi, Japan

[21] Appl. No.: 83,809

[22] Filed: Aug. 11, 1987

[51] Int. Cl.$^4$ ............................................... B08B 7/00
[52] U.S. Cl. .......................................... 134/1; 134/2; 134/16; 15/94
[58] Field of Search .................. 134/1, 2, 16; 15/94; 51/59.55; 366/127, 110, 111, 112, 114, 116, 117; 210/222; 335/314–316

[56] References Cited

U.S. PATENT DOCUMENTS 3,887,457  6/1975  Marston et al. ..................... 210/222
4,490,180  12/1984 Prikhodko et al. ...................... 134/1
4,590,636  5/1986  Wehrmann .............................. 134/1
4,691,724  9/1987  Garcia et al. ............................ 134/1

*Primary Examiner*—Asok Pal
*Attorney, Agent, or Firm*—Finnegan, Henderson, Farabow, Garrett and Dunner

[57] ABSTRACT

In this method for removing spatter deposits accumulated upon the inner surface of the end portion of a tubular arc welding torch nozzle, an end portion of a welding rod being fed for arc welding through an end portion of this nozzle with a space being left between this welding rod and the inner surface of the end portion of the nozzle, an electrical current is supplied through an electromagnetic coil positioned longitudinally proximate to the end portion of the nozzle. This electrical current typically generates an electromagnetic force upon the spatter deposits in the general direction parallel to the central axis of the nozzle, thus removing such spatter deposits from the inner surface of the end portion of the nozzle. The electrical current through the electromagnetic coil may further be provided from a condenser, in which case it will be quickly varying, and yet further the electromagnetic force may be advantageously concentrated by a sheath of ferromagnetic material fitted around the electromagnetic coil. A device is also disclosed for implementing this method.

3 Claims, 2 Drawing Sheets

METHOD AND DEVICE FOR ELECTROMAGNETIC REMOVAL OF SPATTER ON NOZZLE OF ARC WELDING TORCH

BACKGROUND OF THE INVENTION

The present invention relates to a method and a device for removing spatter which has accumulated on a nozzle of an arc welding torch, and more particularly relates to such a method and a device for removing such accumulated spatter, in which the application of a sharp electromagnetic force detaches the spatter from said arc welding torch nozzle and removes it away therefrom. Particularly, the present invention is applicable to the removal of spatter from the interior cylindrical surface of the tip portion of the nozzle of an arc welding torch which is used for so called gas shielded welding.

Nowadays various arc welding processes are often employed, and in these the tip of a welding wire or rod is approached near to an article or articles to be welded, and an arc is set up between said welding rod tip and said article or articles to be welded, so as locally to raise up the temperature of the part or parts to be welded so that they locally melt. In particular, arc welding processes employing a flow of a so called shield gas, i.e. of a gas which is inert and which particularly does not contain any substantial amount of free oxygen, are frequently used for welding articles made of a metal or metals which are liable to be deleteriously oxidized if such a gas shield is not utilized. And in such a process typically a nozzle is provided around the aforesaid tip of the welding rod where the welding process is actually occurring, so as to direct and channel the flow of the shield gas in an appropriate manner.

A concrete example of such a construction is shown in longitudinal sectional view in FIG. 1 of the accompanying drawings: in this figure, which generally relates to the present invention but in which the shown arc welding torch (which itself does not incorporate the present invention) is of a per se known and prior art type, the reference numeral 1 denotes a tubular tip portion of a nozzle denoted as a whole as 10 of an arc welding torch, and the main body 2 of this arc welding torch, to which said tubular nozzle tip portion 1 is threadingly fitted, is formed with an internal cavity in which a tubular welding rod holder 4 is provided. This tubular welding rod holder 4 has a contact tip portion 3 at its extreme end located just within the open end portion of the tubular nozzle tip portion 1, and in a tubular hole formed through said tubular welding rod holder 4 and said contact tip portion 3 there is slidably fitted a welding rod 5 with its end portion projecting out from the contact tip portion 3 and the tubular nozzle tip portion 1. As the welding process is conducted in a per se known manner, the welding rod 5 is steadily consumed by the arc which is set up between the tip portion of said welding rod 5 and the work piece or pieces, and accordingly more of said welding rod 5 is continuously fed through the contact tip portion 3 from the tubular welding rod holder 4 from a source not particularly shown in the figure. Meanwhile, during the welding process, a flow 9 of so called shield gas, which should be an inert gas particularly not containing any substantial quantity of free oxygen, is introduced through a hole 8 into the inside of this welding torch nozzle 10, i.e. into the interior portions of the body 2 of the welding torch and of the tubular nozzle tip portion 1, around the contact tip portion 3 and the tubular welding rod holder 4 housed therein, and this shield gas flow 9 flows out of the open end of the tubular nozzle tip portion 1, around the end of the welding rod 5 at which the welding process is being conducted. Thereby the molten metal portions involved in the welding process, and the welding arc, are shielded from the oxygen in the atmosphere, and said molten metal portions are prevented from degradation, thus improving the efficiency of welding action.

However, a problem conventionally arises with the use of such a type of welding torch and nozzle, as follows. As the welding process is conducted, molten metal droplets from the molten metal portions involved in the welding process are expelled from said portions, and strike against, particularly, the interior portions of the tubular nozzle tip portion 1, i.e. against the extreme tip portions of the inner cylindrical surface of said tubular nozzle tip portion 1, and then solidify and adhere there as spatter deposits such as those which are denoted in FIG. 1 by the reference numeral 6. As a result of this process, after substantial building up of such spatter deposits 6, the flow of the shield gas flow 9 through said tubular nozzle tip portion 1 becomes uneven and is disturbed, and as a consequence the shielding capability of said shield gas flow 9 is deteriorated, and atmospheric air comes to be able to reach the molten metal portons involved in the welding process and the welding arc itself. As a result, air holes such as so called blow holes are liable to be generated in the welded portions of the work, and the mechanical strength and other properties of the weld are liable to be deteriorated.

Conventionally, in order to prevent these problems, such spatter deposits 6 have been removed by the use of a brush or the like; such a concept is disclosed, for example, in Japanese Patent Application Laying Open Publication Ser. No. 59-73186 (1984), which it is notintended hereby to admit as prior art to the present patent application except to the extent in any case mandated by applicable law. However, since the tubular nozzle tip portion 1 is normally made of metal, the accumulation of the spatter deposits 6 is accordingly fairly rapid, and therefore such removal work must necessarily be performed relatively frequently, which causes problems of increased labor requirements and reduced efficiency of utilization of manufacturing facilities. Further, repeated brushing of the tubular nozzle tip portion 1 is liable to deteriorate it.

Another approach to prevention of these problems, is to remove such spatter deposits 6 by the use of a spatter removal device equipped with a rotary blade, in a so called scraping process; such a concept is disclosed, for example, in Japanese Utility Model Application Laying Open Publication Ser. No. 58-47381 (1983), which also it is not intended hereby to admit as prior art to the present patent application except to the extent in any case mandated by applicable law. However, in such a case, such repeated scraping of the tubular nozzle tip portion 1 is even more liable to damage or to deteriorate it.

Yet another approach to prevention of these problems is for the tubular nozzle tip portion 1 to be made out of a ceramic material; such a concept is disclosed, for example, in Japanese Utility Model Application Laying Open Publication Ser. No. 48-12323 (1973), which also it is not intended hereby to admit as prior art to the present patent application except to the extent in any case mandated by applicable law. However, in such a case, although the deposition of the spatter deposits 6 is reduced, it still occurs to some extent, and accordingly the work of spatter deposit removal is still required. Further, such a ceramic nozzle is even more liable to damage such as cracking during such spatter deposit removal.

Another problem attendant upon such spatter deposit removal is that, if the removal of the spatter deposits 6 is attempted immediately after the welding process, the temperature of the tubular nozzle tip portion 1 may be so high that the operator may burn himself or herself. This problem is accentuated with the use of a ceramic nozzle, which has a lower coefficient of thermal conductivity and accordingly takes longer to cool down.

Yet another problem attendant upon such spatter deposit removal is that, during the removal of the spatter deposits 6, it is quite likely that the tubular nozzle tip portion 1 may become scratched. Again, this problem is accentuated with the use of a ceramic nozzle, which by its nature is more easily damaged. if such scratching should occur, not only will the tubular nozzle tip portion 1 become more prone to the accumulation of spatter deposits 6 in the future, but it may be weakened and become subject to subsequent cracking.

SUMMARY OF THE INVENTION

The inventors of the present invention have considered the problems detailed above in the aforementioned prior art methods for removal of spatter deposits from the tip portion of a welding nozzle of a welding torch, and have considered various possibilities for more effectively performing such spatter deposit removal.

Accordingly, it is the primary object of the present invention to provide an improved method for removal of spatter deposits from the end portion of a nozzle of an arc welding torch, which avoids the problems detailed above.

It is a further object of the present invention to provide such a method for removal of spatter deposits from the end portion of a nozzle of an arc welding torch, which can remove spatter deposits effectively and easily.

It is a further object of the present invention to provide such a method for removal of spatter deposits from the end porton of a nozzle of an arc welding torch, which allows for welding quality to be kept good.

It is a further object of the present invention to provide such a method for removal of spatter deposits from the end portion of a nozzle of an arc welding torch, which reduces the need for correction of defective welding work.

It is a further object of the present invention to provide such a method for removal of spatter deposits from the end portion of a nozzle of an arc welding torch, which can perform spatter deposit removal without any physical contact with the spatter deposits or the torch nozzle end portion being required to be made.

It is a further object of the present invention to provide such a method for removal of spatter deposits from the end portion of a nozzle of an arc welding torch, which allows the effective operational life of the nozzle to be maximized.

It is a further object of the present invention to provide such a method for removal of spatter deposits from the end portion of a nozzle of an arc welding torch, which can be performed relatively quickly.

It is a further object of the present invention to provide such a method for removal of spatter deposits from the end portion of a nozzle of an arc welding torch, which economizes upon utilization of labor.

It is a further object of the present invention to provide such a method for removal of spatter deposits from the end portion of a nozzle of an arc welding torch, which economizes upon utilization of manufacturing facilities.

It is a further object of the present invention to provide such a method for removal of spatter deposits from the end portion of a nozzle of an arc welding torch, which is not liable to deteriorate such torch nozzle end portion by scratching or cracking or weakening.

It is a further object of the present invention to provide such a method for removal of spatter deposits from the end portion of a nozzle of an arc welding torch, which does not entail any risk that the operator should burn himself or herself.

It is a further object of the present invention to provide such a method for removal of spatter deposits from the end portion of a nozzle of an arc welding torch, which does not entail the rendering of the nozzle more liable to accumulation of spatter deposits over a period of time.

It is a yet further object of the present invention to provide a device for implementation of such a method for removal of spatter deposits from the end portion of a nozzle of an arc welding torch.

It is a yet further object of the present invention to provide such a device for implementation of such a method for removal of spatter deposits from the end portion of a nozzle of an arc welding torch, which is relatively cheap.

According to the most general method aspect of the present invention, these and other objects are attained by, for an arc welding torch comprising a tubular nozzle, through an end portion of which a welding rod is fed for arc welding with a space being left between said welding rod and the inner surface of the end portion of said tubular nozzle: a method for removing spatter deposits accumulated upon said inner surface of said end portion of said tubular nozzle, wherein an electrical current is supplied through an electromagnetic coil positioned longitudinally proximate to said end portion of said tubular nozzle and an electromagnetic force is generated for removing said spatter deposits; and, according to the most general device aspect of the present invention, these and other objects are attained by, for an arc welding torch comprising a tubular nozzle, through an end portion of which a welding rod is fed for arc welding with a space being left between said welding rod and the inner surface of the end portion of said tubular nozzle: a device for removing spatter deposits accumulated upon said inner surface of said end portion of said tubular nozzle, comprising: an electromagnetic coil positioned longitudinally proximate to said end portion of said tubular nozzle; and: a means for supplying an electrical current through said electromagnetic coil.

According to such a device and such a method as described above, the spatter deposits can be removed from the inner surface of the end portion of the nozzle of the arc welding torch effectively and easily by supplying such an electrical current, which advantageously may be a quickly varying electrical current, through said electromagnetic coil, so as to induce an electromagnetic force which exerts forces upon sad spatter deposits so as to tear them away from said nozzle end portion inner surface. Since this spatter deposit removal is performed without any requirement for indulgence in any physical contact with the spatter deposits or the torch nozzle end portion like the brushing or the scraping that were required according to prior art methods of spatter removal as described previously, accordingly there is no danger of the occurrence of deterioration of such torch nozzle end porton by scratching or cracking or weakening, and thus the effective operational life of the nozzle can be maximized. Further, this method for removal of spatter deposits from the end portion of a nozzle of an arc welding torch can be performed relatively quickly, and accordingly economizes upon utilization of labor and upon utilization of manufacturing facilities. Because the operator is not required to dismantle or otherwise to touch the welding nozzle, there is no risk that said operator should burn himself or herself. And also there is no risk that scratching of the inner surface of the end portion of the nozzle should entail the rendering of the nozzle more liable to accumulation of spatter deposits over a period of time. Yet further, it is possible to make such a device for removal of spatter deposits from the end portion of a nozzle of an arc welding torch relatively cheaply, which provides advantages of economy. And, because it is possible to remove the spatter deposits substantially completely, it is possible to substantially constantly maintain the effectiveness of the shielding effect provided by a flow of shield gas which is being directed between the nozzle and the welding rod, thus ensuring that welding defects such as blow holes or the like in the finished work are not substantially generated, and this reduces the need for correction of defective welding work, as compared with the situation with respect to the prior art.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference symbols, unless otherwise so specified, denote the same parts and apertures and so on in the two figures, which relate to two different preferred embodiments; and:

DESCRIPTION OF THE PREFERRED EMBODIMENTS

The present invention will now be described with reference to the preferred embodiments of the device and of the method thereof, and with reference to the figures.

Overall Structure of the First Preferred Embodiment

Figure 1:
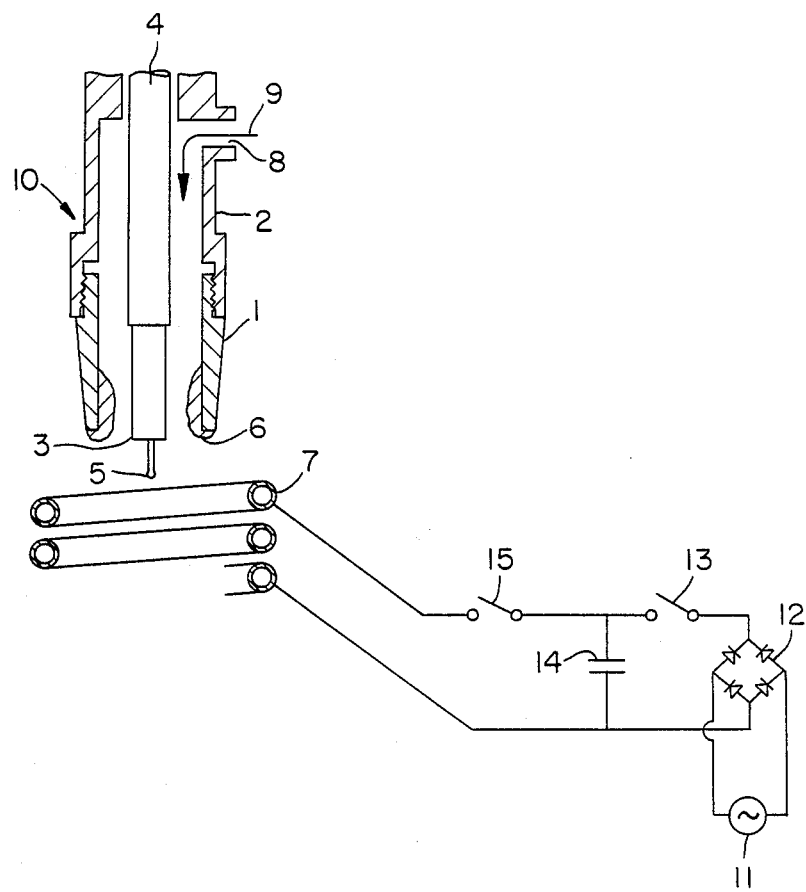
FIG. 1 is a schematic longitudinal sectional view showing the tip portion of a per se conventional arc welding torch, spatter deposits upon which are being removed by the first preferred embodiment of the device for removal of spatter deposits from the end portion of a nozzle of an arc welding torch of the present invention, according to the first preferred method embodiment.

FIG. 1 is a schematic longitudinal skeleton view of the tip portion of an arc welding torch of the sort described in the portion of this specification entitled "Background of the Invention". In this figure, the reference numeral 10 denotes the nozzle portion of the arc welding torch as a whole, and the reference numeral 1 denotes the tubular tip portion 10. In this exemplary application of the present invention, said tubular nozzle tip portion 1 is made of a ceramic material such as silicon nitride; however, other materials which are relatively heat resistant and relatively resistant to the adhesion of spatter deposits may be utilized. The main body of this arc welding torch is denoted as 2, and to said main body 2 said tubular nozzle tip portion 1 is threadingly fitted. The torch main body 2 is formed with an internal cavity in which a tubular welding rod holder 4 is provided, said tubular welding rod holder 4 having a contact tip portion 3 at its extreme end located just within the open end portion of the tubular nozzle tip portion 1, and in a tubular hole formed through said tubular welding rod holder 4 and said contact tip portion 3 there is slidably fitted a welding rod 5 with its end portion projecting out from the contact tip portion 3 and the tubular nozzle tip portion 1. And, as the welding process is conducted in a per se known manner, the welding rod 5 is steadily consumed by the arc which is set up between the tip portion of said welding rod 5 and the work piece or pieces, and accordingly more of said welding rod 5 is continuously fed through the contact tip portion 3 from the tubular welding rod holder 4 from a source not particularly shown in the figure. Meanwhile, during the welding process, a flow 9 of shield gas, which should be an inert gas particularly not containing any substantial quantity of free oxygen, is introduced through a hole 8 into the inside of this welding torch nozzle 10, i.e. into the interior portions of the body 2 of the welding torch and of the tubular nozzle tip portion 1, around the contact tip portion 3 and the tubular welding rod holder 4 housed therein, and this shield gas flow 9 flows out of the open end of the tubular nozzle tip portion 1, around the end of the welding rod 5 at which the welding process is being conducted. Thereby the molten metal portions involved in the welding process, and the welding arc, are shielded from the oxygen in the atmosphere, and said molten metal portions are prevented from degradation.

An apparatus, the first preferred embodiment of the device for removal of spatter deposits from the end portion of a nozzle of an arc welding torch of the present invention, is provided for removing the spatter deposits 6 from the tubular nozzle tip portion 1, as will now be described. An electromagnetic coil 7 is provided, located axially proximate, when this spatter removal device is being used (as is illustrated in the figure), to the tubular nozzle tip portion 1, and a drive circuit as shown in FIG. 1 is provided to said electromagnetic coil 7, said drive circuit being connected to an AC power source 11, which may typically be a public utility AC power source. This drive circuit comprises a full wave rectifier 12, and DC electricity rectified from the AC power source 11 by said rectifier 12 is selectively supplied via a switch 13 to a condenser 14 of a relatively large capacity. And, also, said condenser can be selectively connected via another switch 15 to the electromagnetic coil 7.

Operation of this First Preferred Embodiment

This first preferred embodiment of the device for removal of spatter deposits from the end portion of a nozzle of an arc welding torch of the present invention operates as follows, according to the first preferred embodiment of the method for removal of spatter deposits from the end portion of a nozzle of an arc welding torch of the present invention.

First, the switch 15 is opened while the switch 13 is closed, and as a result the condenser 14 is charged up by DC electricity rectified from the AC power source 11 by the rectifier 12. Then the switch 13 is opened.

Meanwhile, the welding torch with its nozzle 10 is being used by the operator. During the welding process, accumulations of spatter deposits 6 are built up as shown in FIG. 1 on the inner circumferential surface of the tubular nozzle tip portion 1.

When it is considered by the operator that these spatter deposits 6 are built up to such an extent as to present a problem, then he or she ceases to weld for the moment, and approaches the tubular nozzle tip portion 1 of the welding torch to the electromagnetic coil 7, to bring these parts to the relative positions shown in FIG. 1 (i.e. to a position of axial proximity), and then the switch 15 is closed. As a result, a sudden pulse of electrical current of relatively high amperage, the rate of change of said amperage of said pulse of electrical current with time also being relatively high, is directed through the electromagnetic coil 7 from the condenser 14 for a relatively short time. This causes a relatively large electromagnetic field with relatively large time rate of variation to be generated within said electromagnetic coil 7 for a relatively short time, and this relatively quickly varying electromagnetic field exerts substantial magnetic force upon the spatter deposits 6 within the tubular nozzle tip portion 1, since said spatter deposits are typically formed of a material which is attracted by magnetic force). (At this time these spatter deposits 6 may be in a solidified state, or alternatively they may still be in a partially molt;en state, if magnetically attractable in such a state). These forces applied to the various portions of the spatter deposits 6 in fact act in the generally longitudinal direction of the tubular nozzle tip portion 1, along parallel to its central axis. Accordingly, the spatter deposits 6 are torn away from the inner circumferential surface of the tubular nozzle tip portion 1, to become loose and to fall away. Thereby, said tubular nozzle tip portion 1 is cleansed of said spatter deposits 6, and the welding gun can again be used for welding.

Thereby, according to such a device and such a method according to the first preferred embodiment of the present invention as described above, the spatter deposits 6 are removed from the end of the end portion of the nozzle 10 of the arc welding torch effectively and easily. Further, since this spatter deposit removal is performed without any requirement for indulgence in any physical contact with the spatter deposits or the torch nozzle end portion like the brushing or the scraping that are required according to prior art methods of spatter removal as described previously, accordingly there is no danger of the occurrence of deterioration of said torch nozzle end portion by scratching or cracking or weakening, and thus the effective operational life of the nozzle can be maximized. Further, this method for removal of spatter deposits from the end portion of a nozzle of an arc welding torch can be performed relatively quickly, and accordingly economizes upon utilization of labor and upon utilization of manufacturing facilities. Because the operator is not required to dismantle or otherwise to touch the welding nozzle, there is no risk that said operator should burn himself or herself. And also there is no risk that scratching of the inner surface of the end portion of the nozzle should entail the rendering of the nozzle more liable to accumulation of spatter deposits over a period of time. Yet further, it is possible to make this device for removal of spatter deposits from the end portion of a nozzle of an arc welding torch relatively cheaply, which provides advantages of economy. And, because according to these first preferred embodiments of the device and the method for removal of spatter deposits from the end portion of a nozzle of an arc welding torch of the present invention it is possible to remove the spatter deposits 6 substantially completely, it is possible to substantially constantly maintain the effectiveness of the shielding effect provided by the shield gas flow 9, thus ensuring that welding defects such as blow holes or the likeare not substantially generated, and this reduces the need for correction of defective welding work, as compared with the situation with respect to the prior art.

Overall Structure of the Second Preferred Embodiment

Figure 2:
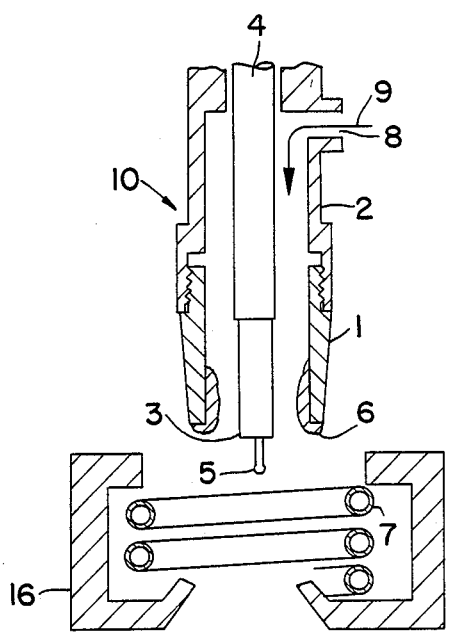
FIG. 2 is similar to FIG. 1, being likewise a schematic longitudinal sectional view showing the tip portion of a per se conventional arc welding torch, spatter deposits upon which are being removed by the second preferred embodiment of the device for removal of spatter deposits from the end portion of a nozzle of an arc welding torch of the present invention, according to the second preferred method embodiment.

FIG. 2 shows, like FIG. 1 for the first preferred embodiments, a schematic longitudinal sectional view of the tip portion of a per se conventional arc welding torch, spatter deposits upon which are being removed by the second preferred embodiment of the device for removal of spatter deposits from the end portion of a nozzle of an arc welding torch of the present invention, according to the second preferred method embodiment. In this figure, like reference symbols to ones in FIG. 1 denote like parts and apertures and so on.

The only substantial difference between this second preferred embodiment and the first preferred embodiment shown in FIG. 1 is that additionally a sheath 16 of ferromagnetic material is fitted substantially entirely around the electromagnetic coil 7.

Operation of this Second Preferred Embodiment

The effect provided by this sheath 16 of ferromagnetic material fitted around the electromagnetic coil 7 is that the electromagnetic flux generated by said electromagnetic coil 7 is confined and is effectively directed towards the spatter deposits 6, thus increasing the effectiveness of removal of said spatter deposits 6.

Although the present invention has been shown and described in terms of the preferred embodiments of the device and of the method thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. An arc welding torch comprising:

a tubular nozzle having an open end portion with an axially extending central bore communicating with the open end portion and defining an axially extending internal wall of the nozzle, the central bore being adapted to contain an arc welding rod that extends through the open end portion and is annularly spaced from the internal wall;

an annular electromagnetic coil mounted substantially concentric with the tubular nozzle and movable axially relative to the nozzle for positioning the coil remote from the nozzle adjacent the open end thereof; and means for energizing the electromagnetic coil at times when the coil is in the remote position for creating an electromagnetic field having sufficient force in a direction parallel to the central axis for removing through the open end portion of the nozzle metallic spatter deposits adhering to the internal wall of the nozzle.

2. A device according to claim 1, wherein said means for energizing the electromagnetic coil includes a condenser operatively connected to the coil for storing electrical energy, and an on-off switch electrically connected to the condenser and the electromagnetic coil for momentarily discharging the condenser for energizing said electromagnetic coil.

3. A device according to claim 1, further comprising a sheath of ferromagnetic material fitted around said electromagnetic coil for concentrating the flux of the magnetic field toward a portion of the internal wall adjacent the open end portion of said tubular nozzle.

* * * * *